US010211637B2

(12) United States Patent
Tang et al.

(10) Patent No.: US 10,211,637 B2
(45) Date of Patent: Feb. 19, 2019

(54) FAST GENERATION ADJUSTMENT ALGORITHM FOR ENERGY MANAGEMENT SYSTEM

(71) Applicant: THE UNIVERSITY OF HONG KONG, Hong Kong (CN)

(72) Inventors: Yuchen Tang, Fujian (CN); Jin Zhong, Hong Kong (CN)

(73) Assignee: THE UNIVERSITY OF HONG KONG, Hong Kong SAR (CN)

( * ) Notice: Subject to any disclaimer, the term of this patent is extended or adjusted under 35 U.S.C. 154(b) by 9 days.

(21) Appl. No.: 15/526,187

(22) PCT Filed: Nov. 13, 2014

(86) PCT No.: PCT/CN2014/090980
§ 371 (c)(1),
(2) Date: May 11, 2017

(87) PCT Pub. No.: WO2016/074187
PCT Pub. Date: May 19, 2016

(65) Prior Publication Data
US 2017/0317499 A1    Nov. 2, 2017

(51) Int. Cl.
*H02J 3/38* (2006.01)
*H02J 13/00* (2006.01)
(Continued)

(52) U.S. Cl.
CPC ............ *H02J 3/382* (2013.01); *G05B 13/024* (2013.01); *G05B 15/02* (2013.01);
(Continued)

(58) Field of Classification Search
CPC ........... H02J 2003/003; H02J 2003/007; H02J 3/382; H02J 3/383; H02J 3/386;
(Continued)

(56) References Cited

U.S. PATENT DOCUMENTS 8,566,266 B2 * 10/2013 Nikovski ............. G05B 13/024
706/46
8,996,187 B2 * 3/2015 Sharma ..................... H02J 3/14
700/291
(Continued)

FOREIGN PATENT DOCUMENTS

CN    102184475 A    9/2011
CN    103049799 A    4/2013
(Continued)

OTHER PUBLICATIONS

International Search Report in corresponding PCT Application No. PCT/CN2014/090980, dated Jul. 30, 2015.

*Primary Examiner* — Crystal J Barnes-Bullock
(74) *Attorney, Agent, or Firm* — Leason Ellis LLP

(57) ABSTRACT

A method is proposed for real-time economic dispatch in power system operation, especially in systems that include renewable power sources that may cause heavy deviations from a generation schedule due to their uncertain outputs. According to the method an optimal generation schedule is obtained based on forecasted load data. This schedule has to be adjusted if the actual load and renewable energy source outputs unexpectedly deviate from the forecasted value. An algorithm employed in the method is capable of dictating generation adjustments which minimize total generation costs. The algorithm is a modification of the base point and participation factor method. It differs from existing methods in that a precise model of transmission losses is adopted in the algorithm to achieve higher accuracy in optimization. The proposed method also has significant advantage in execution speed so that it is suitable for real-time operation.

12 Claims, 2 Drawing Sheets

(51) Int. Cl.
*G05F 1/66* (2006.01)
*G06Q 10/06* (2012.01)
*G05D 23/19* (2006.01)
*G05B 13/02* (2006.01)
*G06Q 10/04* (2012.01)
*G06Q 50/06* (2012.01)
*G05B 15/02* (2006.01)
*G06F 17/11* (2006.01)
*H02J 3/46* (2006.01)
*H02J 3/00* (2006.01)
*G06Q 30/02* (2012.01)

(52) U.S. Cl.
CPC .......... *G05D 23/1917* (2013.01); *G05F 1/66* (2013.01); *G06F 17/11* (2013.01); *G06Q 10/04* (2013.01); *G06Q 10/0631* (2013.01); *G06Q 50/06* (2013.01); *H02J 3/383* (2013.01); *H02J 3/386* (2013.01); *H02J 3/46* (2013.01); *H02J 13/00* (2013.01); *H02J 13/0013* (2013.01); *G06Q 30/0202* (2013.01); *H02J 2003/003* (2013.01); *H02J 2003/007* (2013.01); *Y02B 90/2607* (2013.01); *Y02E 40/72* (2013.01); *Y02E 40/76* (2013.01); *Y04S 10/123* (2013.01); *Y04S 10/54* (2013.01); *Y04S 10/545* (2013.01); *Y04S 50/14* (2013.01)

(58) Field of Classification Search
CPC ...... H02J 13/30; H02J 13/0013; G06Q 10/04; G06Q 10/0631; G06Q 50/06; G05F 1/66; G05D 23/1917; G05B 13/024; G01R 19/2513; Y04S 10/123; Y04S 10/54; Y04S 10/545; Y02E 10/563; Y02E 10/566; Y02E 10/763; Y02E 40/72; Y02E 40/76; Y02B 90/2607
See application file for complete search history.

(56) References Cited

U.S. PATENT DOCUMENTS

| | | | |
|---|---|---|---|
| 9,026,259 B2* | 5/2015 | Zadeh ................ | H02J 13/0013 700/291 |
| 9,859,828 B2* | 1/2018 | Tarnowski ............... | H02J 3/24 |
| 9,876,356 B2* | 1/2018 | Sun .......................... | H02J 3/14 |
| 9,880,576 B2* | 1/2018 | McCullough ............ | H02J 3/00 |
| 2004/0260489 A1 | 12/2004 | Mansingh et al. | |
| 2009/0030623 A1* | 1/2009 | Jang ..................... | G01R 19/2513 702/59 |
| 2012/0185106 A1* | 7/2012 | Ghosh .................... | G06Q 10/04 700/291 |
| 2016/0141873 A1* | 5/2016 | Ellice-Flint ............. | H02J 3/387 307/20 |
| 2017/0003700 A1* | 1/2017 | Pavlovski .............. | G06Q 50/06 |
| 2017/0102726 A1* | 4/2017 | Goldsmith ............ | G06Q 50/06 |

FOREIGN PATENT DOCUMENTS

| | | |
|---|---|---|
| CN | 103632207 A | 3/2014 |
| CN | 103942613 A | 7/2014 |
| JP | 2002176729 A | 6/2002 |
| KR | 20150037410 A * | 4/2015 |

* cited by examiner

FAST GENERATION ADJUSTMENT ALGORITHM FOR ENERGY MANAGEMENT SYSTEM

CROSS-REFERENCE TO RELATED PATENT APPLICATIONS

This application is a U.S. National Phase Application under 35 U.S.C. § 371 of International Patent Application No. PCT/CN2014/090980, filed Nov. 13, 2014, which is incorporated by reference in their entirety herein. The International Application was published in China on May 19, 2016 as International Publication No. WO 2016/074187 A1 under PCT Article 21(2).

FIELD OF THE INVENTION

The present invention relates to the real-time economic dispatch of power during power system operation. It can be used as a component in an Energy Management System.

BACKGROUND OF THE INVENTION

In power system operation, power generation schedules are built based on forecasted load. The objective is to ensure stable and economic operation. These schedules are part of an Energy Management System (EMS) that controls an entire energy system. Current EMS systems provided by vendors such as Siemens, ABB and Alstom, contain real-time economic dispatch functions that use methods such as the optimal power flow method.

One type of schedule is based on the Economic Dispatch ("ED") model in which required power generation is allocated to a number of power generators to meet the varying load demand. The operating cost of the power system depends on the total fuel cost of these power generators. Therefore, the model seeks to allocate the load to the lowest cost generators. Thus, by finding the minimum optimal solution of the optimization functions that depend on the fuel cost, ED results in fuel cost saving.

Due to the highly nonlinear characteristics of power systems and generators, ED belongs to a class of nonlinear programming optimization problems that contain equality and inequality constraints, which are computationally hard to solve.

The conventional methods available for solving ED power system real-time economic dispatch problems mainly include the optimal power flow method (OPF) and the traditional participation factors method. The OPF method is generally effective to obtain optimal generation schedules. However, the execution speed is relatively slow in large systems.

Even after the schedules are created, they need to be adjusted if the actual load deviates from the plan. Such adjustments are also necessary if the outputs of renewable energy sources deviate from the forecasted value, and the fluctuation from renewable energy sources could be faster and heavier than loads.

As more renewable energy sources are deployed in power systems, the real-time economic dispatch method is becoming more uncertain because of the fast fluctuations caused by the loads and renewable power sources. As a result, algorithms that can adjust the generation schedules fast and efficiently are needed. The participation factor method could be used to find new optimal operating points after small deviations from the original plan, which is the base point. However, the participation factor method ignores the effect of transmission losses in the optimization process and the accuracy of the result may be poor.

The article by Guoyu et al, "Decoupled economic dispatch using the participation factors load flow," *IEEE Trans. Power App. Syst.*, vol. PAS-104, no. 6, pp. 1377-1384, June 1985, considers transmission losses in a participation factors method. However, in this article a first order approximation of transmission losses is adopted, which is much simpler and is still not very accurate. In the article by Abouheaf et al., "Dynamic formulation and approximation methods to solve economic dispatch problems," *Generation, Transmission & Distribution, JET*, vol. 7, no. 8, pp. 866-873, August 2013, there is disclosed a method with a similar objective to the participation factor method, but the algorithm and modeling of transmission losses are different and the result is still not very accurate.

Thus, it would be advantageous if a method were provided that models transmission losses in a more precise way so that the result is much more accurate and it can be executed more quickly than the prior art.

SUMMARY OF THE INVENTION

The present invention is a method for improving the base point and participation factors method in classical economic dispatch theory. However, the optimization is made much more accurate by involving a precise model of transmission losses. The method of the present invention can obtain optimal generation adjustment results with around 3 to 5 times smaller average error compared to the prior art participation factors method. Further, its execution speed is around 10 times faster than the optimal power flow (OPF) method, which is commonly used for economic dispatch, in practical large power systems. Therefore the method has a high potential for use in future Energy Management Systems ("EMS") and real-time economic dispatch ("ED").

The equal incremental cost principle in the classical economic dispatch model is the basis of the algorithm of the present invention. Assume there is already an original optimal generation schedule. In such a schedule generators should have equal incremental cost at this operating point. If the load or renewable energy sources deviate from the plan, the system generators should be adjusted accordingly. At the new operating point, the generators should still have equal incremental costs in order to achieve optimal results. This means that the change between the original incremental cost and the new incremental cost should be equal for all generators.

The equal incremental cost can be express as a function of the outputs of the generators, and the change of the equal incremental cost can be expressed as a function of these changes in the outputs of generators by means of a Taylor expansion function. Therefore, the problem of the optimal adjustments to generators can be solved.

The difference between the disclosed invention and the participation factor method is that the simple expression of equal incremental cost without transmission losses is used in the participation factor method. This simplifies the equations a lot but the accuracy is worse. However, the algorithm of the present invention adopts the expression of equal incremental cost with transmission losses, and calculates the precise second order derivatives of transmission losses in the equations in order to obtain the generation adjustments. As a result, the accuracy is much better compared to the original participation factor method.

BRIEF DESCRIPTION OF THE DRAWINGS

The foregoing and other objects and advantages of the present invention will become more readily apparent when considered in connection with the following detailed description and appended drawings in which like designations denote like elements in the various views, and wherein.

DETAILED DESCRIPTION OF AN ILLUSTRATIVE EMBODIMENT

Figure 1:
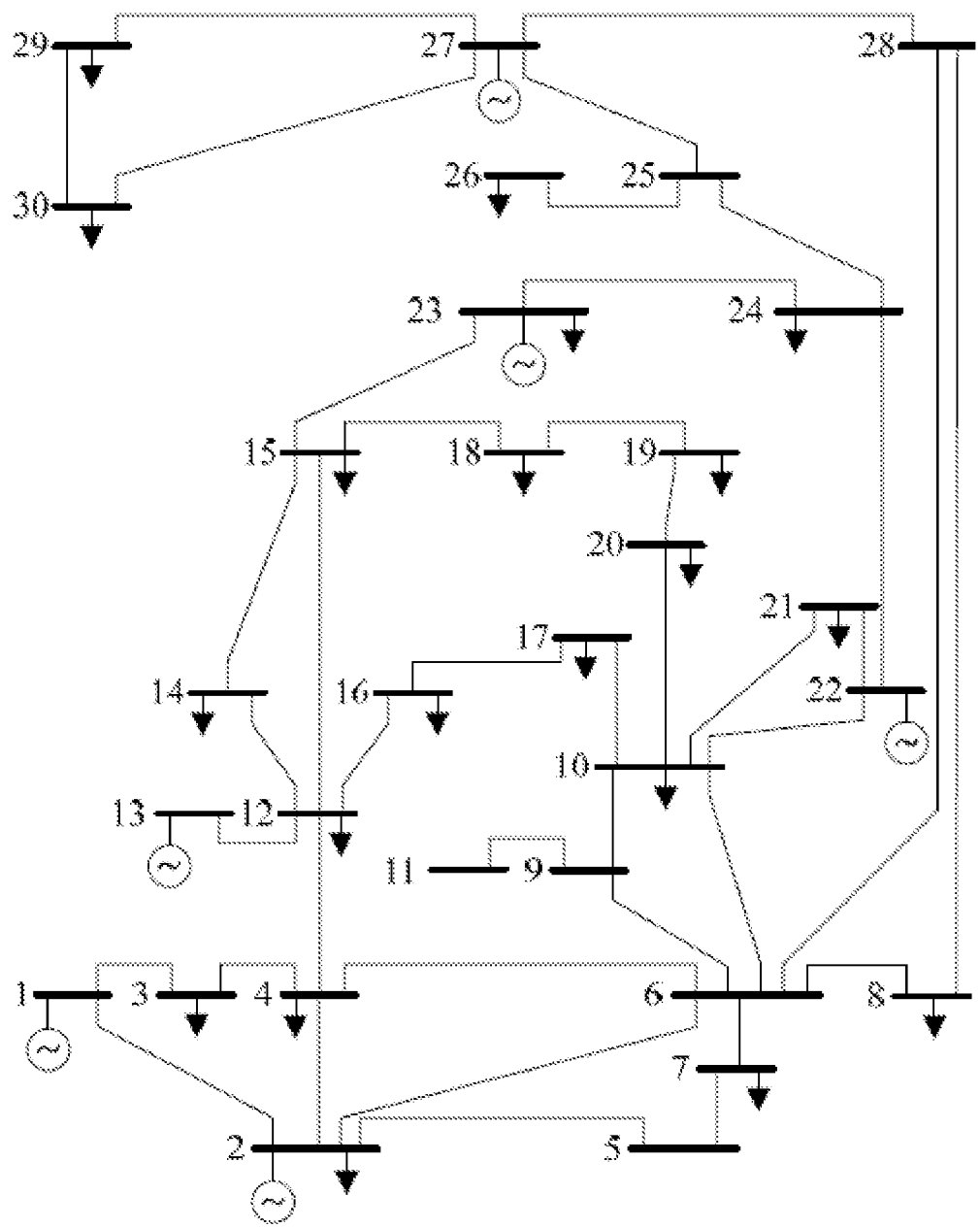
FIG. 1 is a diagram of the IEEE 30 Bus Test Case.

The disclosed invention is a method for real-time economic dispatch that relies upon an algorithm that calculates the optimal generation adjustments when loads deviate from the optimal generation schedule.

Consider a power system with NB buses and NG generators. Assume that an optimal original generation schedule or base point has been given and the deviation of load from the base point is denoted by $\Delta P_D$, which is an NB×1 vector corresponding to each bus in the system. The deviation of renewable energy sources can be regarded as negative load deviation and put into the $\Delta P_D$ vector. The optimal generation adjustment $\Delta P_G$, which is a NG×1 vector for each generator, is to be obtained.

By the classical economic dispatch principle, the incremental cost of all generators in the system will be equal at the base point. The equal incremental cost is expressed as $\lambda^0$, which is also the Lagrange multiplier of the Lagrange function. The symbol $\lambda^0$ involving the transmission losses can be expressed as follows:

$$\lambda_i^0 = \lambda^0 = \frac{\frac{dF_i}{dP_{Gi}}}{\left(1 - \frac{\partial P_L}{\partial P_{Gi}}\right)} \quad (1)$$

After the load deviation, assume that the equal incremental cost moves from $\lambda^0$ to $\lambda^1 = \lambda^0 + \Delta\lambda$ at the new optimal point when the output vector of the generators changes from $P_G$ to $P_G + \Delta P_G$. Expressing $\lambda$ as a function of $P_G$, by a Taylor expansion yields:

$$\lambda^1 = \lambda^0 + \Delta\lambda = \quad (2)$$
$$\lambda^0 + \frac{\partial \lambda_i^0}{\partial P_{G1}} \times \Delta P_{G1} + \frac{\partial \lambda_i^0}{\partial P_{G2}} \times \Delta P_{G2} + \ldots + \frac{\partial \lambda_i^0}{\partial P_{GNG}} \times \Delta P_{GNG}$$

Since the new $\lambda^1$ is equal for all generators, $\Delta\lambda$ should also be equal for all generators. Thus equation (3) holds for i=1 to NG:

$$\Delta\lambda = \frac{\partial \lambda_i^0}{\partial P_{G1}} \times \Delta P_{G1} + \frac{\partial \lambda_i^0}{\partial P_{G2}} \times \Delta P_{G2} + \ldots + \frac{\partial \lambda_i^0}{\partial P_{GNG}} \times \Delta P_{GNG} \quad (3)$$

The precise expression of $\partial \lambda_i / \partial P_{Gj}$ after involving transmission losses is:

$$\frac{\partial \lambda_i^0}{\partial P_{Gj}} = \begin{cases} \frac{\frac{\partial F_i}{\partial P_{Gi}}}{\left(1 - \frac{\partial P_L}{\partial P_{Gi}}\right)^2} \times \frac{\partial^2 P_L}{\partial P_{Gi} \partial P_{Gj}}, & i \neq j \\ \frac{\frac{\partial^2 F_i}{\partial P_{Gi}^2}}{\left(1 - \frac{\partial P_L}{\partial P_{Gi}}\right)} + \frac{\frac{\partial F_i}{\partial P_{Gi}}}{\left(1 - \frac{\partial P_L}{\partial P_{Gi}}\right)^2} \times \frac{\partial^2 P_L}{\partial P_{Gi}^2}, & i = j \end{cases} \quad (4)$$

The original prior art participation factors method ignores the effects of transmission losses, namely $P_L$, $\partial P_L/\partial P_{Gi}$ and $\partial^2 P_L/(\partial P_{Gi} \partial P_{Gj})$ are considered to be zero. However in the proposed algorithm, a precise model of transmission losses is used to calculate $\partial P_L/\partial P_{Gi}$ and $\partial^2 P_L/(\partial P_{Gi} \partial P_{Gj})$. The model has two major characteristics: first it adopts a second order approximation, namely the second order derivatives of losses in generation are calculated, considering the non-linear expression of transmission losses. Second, the slack bus is not the commonly used single reference bus in the prior art transmission losses modeling, but is a particular distributed slack related to the load deviation $\Delta P_D$ vector. These changes achieve a much more accurate modeling of transmission losses.

Assume that the cost functions F for generators are quadratic functions, which are most commonly adopted. The derivatives to F are easy to calculate. The questions are how to calculate the first and second order derivatives of transmission losses to the outputs of the generators.

The disclosed algorithm adopts a second order approximation of the transmission losses and distributed slack in the modeling. The first order derivatives of losses are calculated using (5):

$$\frac{\partial P_L}{\partial P_{Gi}} = \sum_{l=1}^{NL} \frac{\partial P_L}{\partial \theta_{mn}} \times \frac{\partial \theta_{mn}}{\partial P_{Gi}} \quad (5)$$

The term $\partial P_L/\partial \theta_{mn}$ can be calculated by the precise expression of transmission losses:

$$P_L = \sum_{i=1}^{NL} G_{mn} \times (V_m^2 + V_n^2 - 2V_m V_n \times \cos \theta_{mn}) \quad (6)$$

In equation (6), NL is the total number of transmission lines in the system, m and n are the bus indexes at the two ends of line i, $\theta_{mn}$ is the voltage angle difference at the two ends of line i, $V_m$ and $V_n$ are the voltage magnitudes at the two ends of line i, and $G_{mn}$ is the conductance of line i.

The term $\partial \theta_{mn}/\partial P_{Gi}$ can be calculated using sensitivity method with DC power flow model:

$$\Delta\theta = X \times \Delta P \quad (7)$$

The $\Delta P$ vector is set to a unit increment for generator i plus the distributed slack which is equal to the normalized vector of load deviation:

$$\Delta P(j) = \begin{cases} -1, & j = i \\ \alpha_k, & j = k, \text{ any buses with load deviation} \\ 0, & \text{otherwise} \end{cases} \quad (8)$$

And:

$$\alpha_k = \frac{\Delta P_D(k)}{\Sigma \Delta P_d} \quad (9)$$

Notice that this should be calculated for each generator i=1 to NG. Since $\Delta P_{Gi}=1$, $\partial \theta_{mn}/\partial P_{Gi}$ is equivalent to ($\Delta\theta_n - \Delta\theta_m$) using the result of $\Delta\theta$.

The second order derivatives are calculated using (10). $\partial \theta_{mn}/\partial P_{Gi}$ is considered to be constant for a specific case, which is reasonable because the relationship between voltage angle and active power injection is approximately linear.

$$\frac{\partial^2 P_L}{\partial P_{Gi} \partial P_{Gj}} = \sum_{l=1}^{NL}\left[\frac{\partial\left(\sum_{l=1}^{NL} \frac{\partial P_L}{\partial \theta_{mn}} \times \frac{\partial \theta_{mn}}{\partial P_{Gi}}\right)}{\partial \theta_{mn}} \times \frac{\partial \theta_{mn}}{\partial P_{Gj}}\right] = \qquad(10)$$

$$\sum_{l=1}^{NL}\left(\frac{\partial^2 P_L}{\partial \theta_{mn}^2} \times \frac{\partial \theta_{mn}}{\partial P_{Gi}} \times \frac{\partial \theta_{mn}}{\partial P_{Gj}}\right)$$

Put the results of the derivatives into (4), then put (4) into (3). The equations become:

$$\Delta\lambda = \frac{\partial \lambda_1}{\partial P_{G1}} \times \Delta P_{G1} + \frac{\partial \lambda_1}{\partial P_{G2}} \times \Delta P_{G2} + \ldots \frac{\partial \lambda_1}{\partial P_{GNG}} \times \Delta P_{GNG}$$

$$\Delta\lambda = \frac{\partial \lambda_2}{\partial P_{G1}} \times \Delta P_{G2} + \frac{\partial \lambda_2}{\partial P_{G2}} \times \Delta P_{G2} + \ldots \frac{\partial \lambda_2}{\partial P_{GNG}} \times \Delta P_{GNG}$$

$$\ldots$$

$$\Delta\lambda = \frac{\partial \lambda_{NG}}{\partial P_{G1}} \times \Delta P_{G1} + \frac{\partial \lambda_{NG}}{\partial P_{G2}} \times \Delta P_{G2} + \ldots \frac{\partial \lambda_{NG}}{\partial P_{GNG}} \times \Delta P_{GNG}$$

$$\Delta P'_{G1} + \Delta P'_{G2} + \ldots \Delta P'_{GNG} = 1 \qquad(11)$$

The solution to the above equations is the normalized generation adjustment factors $\Delta P_G'$, since the summation of the vector is set to one. This vector will be used for further adjustments due to system constraints and so on. If the system constraints are not considered, the generation adjustment result can be calculated by multiplying the generation adjustment factors with the total load deviation plus the change of transmission losses. The change of loss can be estimated as:

$$\Delta P_L = \Sigma \Delta P_D \times \Delta P_G' \times \frac{\partial P_L}{\partial P_G} \qquad(12)$$

The generation adjustment result is obtained by:

$$\Delta P_G = \Delta P_G' \times (\Sigma \Delta P_D + \Delta P_L) = \Delta P_G' \times \left(\Sigma \Delta P_D + \Sigma \Delta P_D \times \Delta P_G' \times \frac{\partial P_L}{\partial P_G}\right) \qquad(13)$$

Secondary adjustments are needed to ensure that the power system constraints are not violated after the adjustment. These adjustments include:

(1) Only generators which are not operating at their upper or lower limits are involved in the calculation to ensure equal incremental cost. This is feasible for small adjustments around the local point;

(2) Adjust the outputs of the generators if any of them exceed the generators' upper or lower limits. The power which exceeds the limit should be compensated by other generators which have capacity, in proportion to their generation adjustment factors;

(3) Adjust the outputs of the generators if any transmission line is overloaded.

The generation adjustment methodology of the present invention generates the optimal adjustments to generation schedules in real-time economic dispatch, considering the fast fluctuations caused by the loads and renewable power sources. Whenever there is any deviation from the generation schedule, the present invention is able to calculate the adjusted outputs of the generators to obtain minimal total generation cost.

The optimization is effective and reliable, and the execution speed is very fast so as to fulfill the need of real-time operation.

A test of the present invention demonstrates that it can obtain optimal generation adjustment results with about 3 to 5 times smaller average error compared to the participation factors method. Further, its execution speed is more than 20 times faster than the optimal power flow (OPF) method, which is commonly used for the economic dispatch, in practical large power systems.

In order to test the present invention, simulations were executed in the IEEE 30-bus system and the IEEE 118-bus system. The base point result was calculated first and then the generation adjustments were calculated after a load deviation. The results compared include the total generation cost after the adjustment, and the errors of vector $\Delta P_G$ compared to the Alternating Current Optimal Power Flow (AC-OPF) result, which is considered to be the true optimal result.

The IEEE 30 Bus System is shown in FIG. 1, which consists of 6 generators, 41 lines and 30 load buses. In the IEEE 30 bus system at the base point, the optimal generation cost calculated by the AC-OPF method was 8906.15/hr. The method of the present invention, the OPF and the original participation method were used to calculate the optimal generation output when all the loads were increased by 10%. The results are shown in Table 1.

TABLE I

GENERATION ADJUSTMENT RESULTS FOR IEEE 30-BUS SYSTEM

| Method | Generation Cost ($/hr) | Average Error (MW) | Max Error (MW) |
|---|---|---|---|
| AC-OPF | 10053 | — | — |
| Present Invention | 10053 | 0.06 | 0.16 |
| Participation factors | 10055 | 2.17 | 6.58 |

As can be seen from Table 1, the average error for the present invention is very low compared to the conventional participation factors.

The IEEE 118 bus system (not shown) contains 54 generators, 186 lines and 99 load buses. This system has a lot of voltage control devices, and is quite robust, converging in 5 or so iterations with a fast-decoupled power flow. With the IEEE 118-bus system, the total generation cost at base point is 129660.69/hr. The load deviation with a 5% load increase is shown in Table II.

TABLE II

GENERATION ADJUSTMENT RESULTS
(5% LOAD INCREASE)

| Method | Generation Cost ($/hr) | Average Error (MW) | Max Error (MW) |
|---|---|---|---|
| AC-OPF | 138090 | — | — |
| Present Invention | 138092 | 0.23 | 3.24 |
| Participation factors | 138100 | 1.25 | 6.11 |

It can be seen from Table II that the generation cost obtained by the present invention is lower than the participation factor method, and very close to the OPF result. The errors of the present invention are also much lower than the participation factor method.

Table III shows the load deviation for a 10% increase in load.

TABLE III

GENERATION ADJUSTMENT RESULTS
(10% LOAD INCREASE)

| Method | Generation Cost ($/hr) | Average Error (MW) | Max Error (MW) |
|---|---|---|---|
| AC-OPF | 146572 | — | — |
| Present Invention | 146578 | 0.77 | 5.54 |
| Participation factors | 146610 | 2.90 | 11.80 |

Again, the generation cost and errors by the present invention are much lower than the participation factor method.

A comparison of the execution speed or time for the present invention to that of the AC-OPP method is shown in Table IV. This comparison of execution time is for the IEEE 118-bus case.

TABLE IV

Execution Time of AC-OPF and the Proposed Method

| Test system | CPU time (sec) | |
|---|---|---|
| 118-bus system | Present Invention | 0.015 |
| | AC-OPF | 0.32 |

The response time of the current invention is 20 times faster than the OPF method.

The current invention uses a precise second-order model for the transmission losses in the power system, and a distributed slack to access the effect of transmission losses to the generation adjustment factors such that the generation adjustment algorithm is accurate and fast. Small increases in efficiency of dispatch are measured in billions of dollars per year. Since the usual cost of purchasing and installing new software for an existing ISO market is less than 10 million dollars, the potential benefit/cost ratios of better software are in the range of 10 to 1000.

The key idea of the present invention is that the transmission losses will affect the participation factors themselves, and a precise model of transmission losses is used to calculate the new participation factors, namely the "generation adjustment" in the method of the present invention. Further, the proposed method is used to calculate generation adjustments when the load is deviated from the original economic dispatch plan. Different load deviation will lead to a particular distributed slack in the transmission losses modeling.

Figure 2:
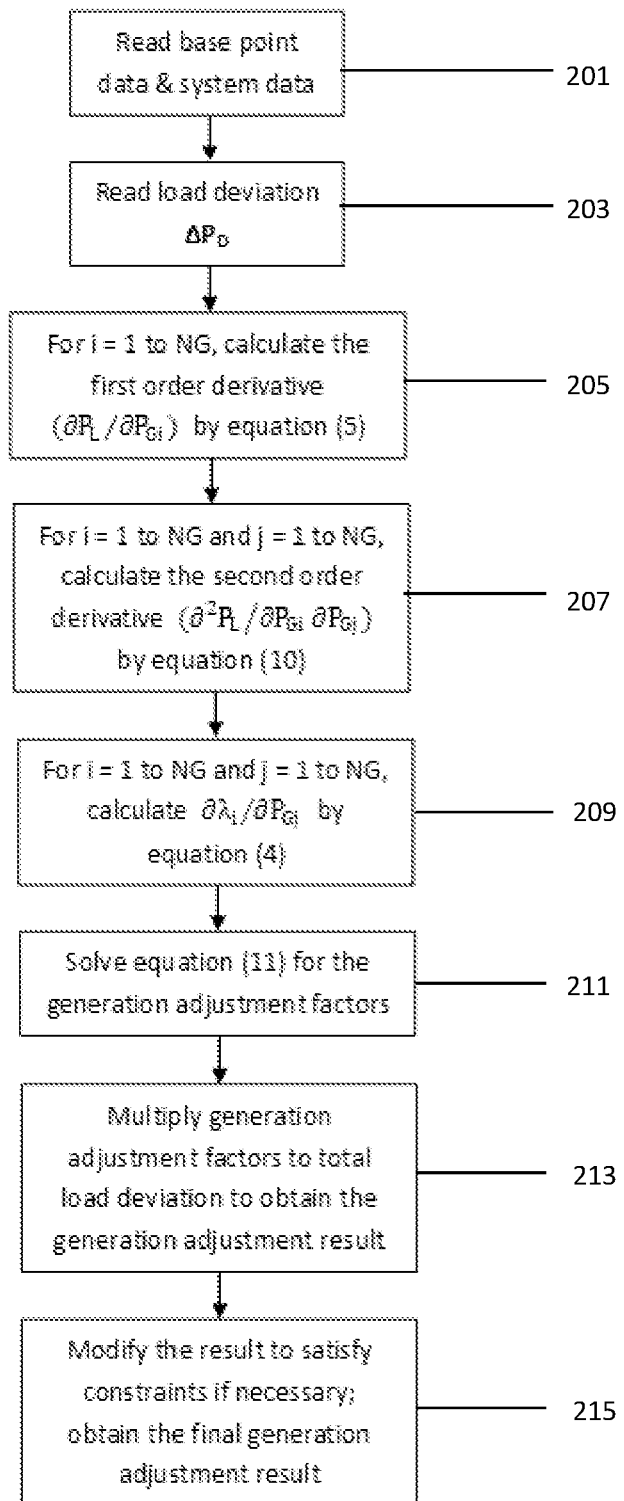
FIG. 2 is a flow chart of the method of the present invention.

FIG. 2 is a flow diagram showing the whole process or method of the present invention. This process is executed at any time point when load deviation from the generation schedule occurs. The process assumes that an optimal generation schedule or base point exists. If is does not exist, the base point is calculated in the conventional manner based on a forecast of the expected load and the goal of achieving equal incremental costs for the system generators. The schedule is executed by computer control of the generating capacity through a standard Energy Management System (EMS).

The first step 201 of the method is to read the base point data and date describing the power distribution system that is being controlled. This data is input to the EMS computer system, which will also execute the algorithm according to the present invention. Next, load deviations $\Delta P_D$ are sensed and in step 203 the load deviation information is entered into the system computer. The computer system in step 205 than calculates the first order derivative $\partial P_L/\partial P_{Gi}$ according to equation (5) for each generator 1 to NG. Similarly, the computer in step 207 calculates the second order derivative $\partial^2 P_L/\partial P_{Gi} \partial P_{Gj}$ according to equation (10) for generators i=1 to NG and j=1 to NG.

In step 209 the computer calculates $\partial \lambda_i/\partial P_{Gj}$ using equation (4) for i=1 to NG and j=1 to NG. Then in step 211 equations (11) are solved for the generation adjustment factors. Each of the generation adjustment factors is multiplied by the total load deviation to obtain the generation adjustment results in step 213. Finally, in step 215 the results are modified to satisfy the constraints, if necessary, in order to obtain the final generation adjustment result.

The present invention can handle most major power system constraints. The algorithm is to be used by being programmed and integrated to existing EMS systems.

While the invention has been particularly shown and described with reference to a preferred embodiment thereof, it will be understood by those skilled in the art that various changes in form and details may be made therein without departing from the spirit and scope of the invention.

What is claimed is:

1. In an electrical power system having buses, power generators and loads, a method of minimizing total generation cost in real-time economic dispatch within the power system, comprising the steps of:

calculating an original power generation schedule for the power generators in the power system based on a forecast of the loads and the fuel cost of operating each generator;

in real-time operation, in response to a deviation of load from the schedule, calculating by a computer in the energy management system the optimal generation adjustments to the original power generation schedule according to the algorithm $$\Delta \lambda = \frac{\partial \lambda_1}{\partial P_{G1}} \times \Delta P_{G1} + \frac{\partial \lambda_1}{\partial P_{G2}} \times \Delta P_{G2} + \ldots \frac{\partial \lambda_1}{\partial P_{GNG}} \times \Delta P_{GNG}$$

$$\Delta \lambda = \frac{\partial \lambda_2}{\partial P_{G1}} \times \Delta P_{G2} + \frac{\partial \lambda_2}{\partial P_{G2}} \times \Delta P_{G2} + \ldots \frac{\partial \lambda_2}{\partial P_{GNG}} \times \Delta P_{GNG}$$

$$\ldots$$

$$\Delta \lambda = \frac{\partial \lambda_{NG}}{\partial P_{G1}} \times \Delta P_{G1} + \frac{\partial \lambda_{NG}}{\partial P_{G2}} \times \Delta P_{G2} + \ldots \frac{\partial \lambda_{NG}}{\partial P_{GNG}} \times \Delta P_{GNG}$$

$$\Delta P'_{G1} + \Delta P'_{G2} + \ldots \Delta P'_{GNG} = 1$$

where Δλ is the change of equal incremental cost before and after the generation adjustment, $\Delta P_{Gi}$ is the output adjustment for generator i, NG is the number of generators in the system; and changing the operation of the power generators through the energy management system in accordance with the calculated generation adjustments to the schedule.

2. The method of claim 1 wherein the load deviations comprise real-power injection changes at any bus of the system.

3. The method of claim 1 wherein the power system includes renewable power sources and fluctuation in the renewable power sources are regarded in the algorithm as negative load deviations.

4. The method of claim 1 wherein the equal incremental cost is the basic principle for the generation adjustment, equal incremental cost holds for every generator in the original generation schedule, and a different equal incremental cost should still hold for every generator after the adjustment; thus the change of the two equal incremental costs (Δλ) should be equal for all generators; and since Δλ can be expressed by the adjustments of generations ($\Delta P_{Gi}$), the equation set can be used to solve $\Delta P_{Gi}$.

5. The method of claim 1 wherein the expression of equal incremental cost takes transmission losses into consideration, and the expression is shown as follow:

$$\lambda_i^0 = \lambda^0 = \frac{\frac{dF_i}{dP_{Gi}}}{\left(1 - \frac{\partial P_L}{\partial P_{Gi}}\right)}$$

where $\lambda^0$ is the original equal incremental cost, $F_i$ is the cost function of generator i, $P_{Gi}$ is the original generation scheduled for generator i, and $P_L$ is the transmission losses.

6. The method of claim 5 wherein the change of equal incremental costs (Δλ) is formulated as the following expression:

$$\Delta \lambda = \frac{\partial \lambda_i^0}{\partial P_{G1}} \times \Delta P_{G1} + \frac{\partial \lambda_i^0}{\partial P_{G2}} \times \Delta P_{G2} + \ldots + \frac{\partial \lambda_i^0}{\partial P_{GNG}} \times \Delta P_{GNG}$$

the index i represents generator i and the above equation holds for i=1 to NG; and $\partial \lambda_i^0 / \partial P_{Gj}$ can be calculated by:

$$\frac{\partial \lambda_i^0}{\partial P_{Gj}} = \begin{cases} \frac{\frac{\partial F_i}{\partial P_{Gi}}}{\left(1 - \frac{\partial P_L}{\partial P_{Gi}}\right)^2} \times \frac{\partial^2 P_L}{\partial P_{Gi} \partial P_{Gj}}, & i \neq j \\ \frac{\frac{\partial^2 F_i}{\partial P_{Gi}^2}}{\left(1 - \frac{\partial P_L}{\partial P_{Gi}}\right)} + \frac{\frac{\partial F_i}{\partial P_{Gi}}}{\left(1 - \frac{\partial P_L}{\partial P_{Gi}}\right)^2} \times \frac{\partial^2 P_L}{\partial P_{Gi}^2}, & i = j \end{cases}$$

7. The method of claim 6 wherein second order approximation of transmission generator' outputs are calculated using a sensitivity method; and wherein a unit increment is set to each generator to calculate these derivatives, and slack of the increment of generation is distributed slack.

8. The method of claim 7 wherein the value of the distributed slack is a normalized vector of load deviation at each bus of the power system.

9. The method of claim 8 wherein the choice of the slack reflects the actual power flow change after the generation increment.

10. The method of claim 7 wherein the derivatives of transmission losses are calculated by the expressions:

$$\frac{\partial P_L}{\partial P_{Gi}} = \sum_{l=1}^{NL} \frac{\partial P_L}{\partial \theta_{mn}} \times \frac{\partial \theta_{mn}}{\partial P_{Gi}}$$

and $$\frac{\partial^2 P_L}{\partial P_{Gi} \partial P_{Gj}} =$$

$$\sum_{l=1}^{NL} \left[ \frac{\partial \left( \sum_{l=1}^{NL} \frac{\partial P_L}{\partial \theta_{mn}} \times \frac{\partial \theta_{mn}}{\partial P_{Gi}} \right)}{\partial \theta_{mn}} \times \frac{\partial \theta_{mn}}{\partial P_{Gj}} \right] = \sum_{l=1}^{NL} \left( \frac{\partial^2 P_L}{\partial \theta_{mn}^2} \times \frac{\partial \theta_{mn}}{\partial P_{Gi}} \times \frac{\partial \theta_{mn}}{\partial P_{Gj}} \right)$$

where NL is the number of transmission lines in the system and $\theta_{mn}$ is the voltage angle difference at the two ends of the transmission line.

11. The method of claim 1, wherein generation adjustments are only calculated for generators not operating at their upper or lower limits.

12. The method of claim 1, wherein any generator whose output exceeds its upper or lower limit is caused to operate at its limit and the power exceeding the limit is compensated by other generators which have capacity, in proportion to the value of their generation adjustment results.

* * * * *